United States Patent
Omosebi et al.

(10) Patent No.: US 9,437,893 B2
(45) Date of Patent: Sep. 6, 2016

(54) IN-MEMBRANE MICRO FUEL CELL

(71) Applicant: THE TRUSTEES OF THE STEVENS INSTITUTE OF TECHNOLOGY, Hoboken, NJ (US)

(72) Inventors: Ayokunle Omosebi, Lexington, KY (US); Ronald Besser, New Providence, NJ (US)

(73) Assignee: The Trustees of the Stevens Institute of Technology, Hoboken, NJ (US)

( * ) Notice: Subject to any disclaimer, the term of this patent is extended or adjusted under 35 U.S.C. 154(b) by 47 days.

(21) Appl. No.: 14/471,753

(22) Filed: Aug. 28, 2014

(65) Prior Publication Data

US 2015/0064605 A1 Mar. 5, 2015

Related U.S. Application Data

(60) Provisional application No. 61/871,601, filed on Aug. 29, 2013.

(51) Int. Cl.
| | |
|---|---|
| *H01M 8/10* | (2016.01) |
| *H01M 2/08* | (2006.01) |
| *H01M 2/14* | (2006.01) |
| *H01M 14/00* | (2006.01) |

(52) U.S. Cl.
CPC ... *H01M 8/1065* (2013.01); *H01M 2008/1095* (2013.01); *Y02E 60/521* (2013.01)

(58) Field of Classification Search
CPC ........... H01M 8/0256; H01M 8/0271; H01M 8/0297; H01M 8/0202; H01M 8/04153
See application file for complete search history.

(56) References Cited

U.S. PATENT DOCUMENTS

| | | |
|---|---|---|
| 6,231,524 B1 | 5/2001 | Wallace et al. |
| 6,946,362 B2 | 9/2005 | Gore et al. |
| 7,714,398 B2 | 5/2010 | Ben-Barak et al. |
| 7,776,386 B2 * | 8/2010 | Koripella ............ H01M 8/1097 427/115 |
| 7,804,787 B2 | 9/2010 | Brandyburg et al. |
| 8,741,501 B2 | 6/2014 | Besser |
| 2004/0058226 A1 * | 3/2004 | Lamarre ............ H01M 4/8605 429/431 |

OTHER PUBLICATIONS

Song et al., "Numerical optimization study of the catalyst layer of PEM fuel cell cathode", Journal of Power Sources 126, 104-111 (2004).

K. Karan, "Assessment of transport-limited catalyst utilization for engineering of ultra-law Pt loading polymer electrolyte fuel cell anode", Electrochemistry Communications 9, 747-753 (2007).

(Continued)

*Primary Examiner* — Patrick Ryan
*Assistant Examiner* — Julian Anthony
(74) *Attorney, Agent, or Firm* — Greenberg Traurig, LLP

(57) ABSTRACT

An in-membrane micro fuel cell comprises an electrically-insulating membrane that is permissive to the flow of cations, such as protons, and a pair of electrodes deposited on channels formed in the membrane. The channels are arranged as conduits for fluids, and define a membrane ridge between the channels. The electrodes are porous and include catalysts for promoting the liberation of a proton and an electron from a chemical species and/or or the recombination of a proton and an electron with a chemical specie. The fuel cell may be provided a biosensor, an electrochemical sensor, a microfluidic device, or other microscale devices fabricated in the fuel cell membrane.

22 Claims, 6 Drawing Sheets

(56) References Cited

OTHER PUBLICATIONS

K. Karan, "Structural Modeling of PEMFC Anode", Proceedings of 211th Meeting of the electrochemical Society, May 6-10, 2007, Chicago, IL.

Zhou, et al.; "Molded, High Surface Area Polymer Electrolyte Membranes from Cured Liquid Precursors", J. Am. Chem. Soc. 2006, 128, 12963-12972.

Lopez-Montesinos et al., "Design, fabrication, and characterization of a planar, silicon-based, monolithically integrated micro laminar flow fuel cell with a bridge-shaped microchannel cross-section", Journal of Power Sources 196, 4638-4645 (2011).

Xiao et al., "Monolithically integrated planar microfuel cell arrays", Sensors and Actuators B 132, 576-586, (2008).

* cited by examiner

IN-MEMBRANE MICRO FUEL CELL

CROSS-REFERENCE TO RELATED APPLICATIONS

The present application claims the benefit of U.S. Provisional Patent Application No. 61/871,601, filed on Aug. 29, 2013, the disclosure of which is incorporated by reference in its entirety.

STATEMENT REGARDING FEDERALLY SPONSORED RESEARCH

The present invention was made with government support under contract No. DAC0298CH10886 by the U.S. Department of Energy, Office of Basic Energy Sciences. The U.S. government has certain rights in the present invention.

FIELD OF THE INVENTION

This invention relates to the field of polymer electrolyte membrane fuel cells.

BACKGROUND OF THE INVENTION

Advances in nano/microfabrication technology have led to the deployment of smaller, faster, and more efficient portable, wireless, and autonomous devices. Today's devices have significantly improved multitasking and computing capabilities that lead to increased energy requirements. These devices currently rely on secondary batteries like the Ni—Cd, Li-ion, and Li-polymers as power sources, but the need for constant replacement and recharging, interrupted operation, disposal issues, and increasing power requirements has prompted the development of alternative power sources like polymer electrolyte fuel cells as replacements.

Conventional polymer electrolyte membrane (PEM) fuel cells find application as power sources for stationary and portable systems. For portable applications, they are marketed as replacements for secondary (rechargeable) batteries which are currently limited for use by their need for constant replacement and recharging, interrupted operation, disposal issues, and inadequate power density for today's sophisticated devices. Fuel cells are high energy power sources that produce direct-current ("DC") electricity directly from the stored chemical energy in their fuel and oxidant inputs. Such inputs are external to the power generation device. A conventional ion-conducting polymer electrolyte membrane (PEM) micro fuel cell is a sandwich-like stack of separate layers that facilitate electronic, protonic, and fluidic transport. Nafion® membranes (DuPont Corp., Wilmington, Del.), for example, are commonly used because of their proton-conducting properties.

In conventional PEM micro fuel cells, the auxiliary layers that serve as flow field, current collectors, and reactant distributors contribute significantly to the size and weight of the device, leading to bulkier devices and consequently reduced power density on a volumetric and mass basis. Moreover, the fabrication of such devices is complicated by the need to separately form the many components (electrodes, flow field, membrane, etc.) by the formation and assembly of individual components from a variety of materials. In the case of microfabricated fuel cells, a suitable support substrate, usually silicon, alumina, glass or other ceramic material which serves only as a passive supporting structure and provides no active function in the operation of the fuel cell, is employed. Such structures suffer from various yield losses due to the complexity of integration and are expensive to realize.

SUMMARY OF THE INVENTION

In an embodiment of the present invention, an in-membrane micro fuel cell comprises an electrically-insulating membrane that is permissive to the flow of cations, such as protons, and a pair of electrodes deposited on channels formed in the membrane. In an embodiment, the channels define a membrane ridge between the channels. In an embodiment, the electrodes are porous. In an embodiment, the electrodes include catalysts. In an embodiment, the catalysts promote the liberation of a proton and an electron from a chemical species and/or or the recombination of a proton and an electron with a chemical specie. In an embodiment, the channels are arranged as conduits for fluids. In an embodiment, the fuel cell is provided in combination with a biosensor fabricated in the fuel cell membrane. In an embodiment, the fuel cell is provided in combination with an electrochemical sensor fabricated in the fuel cell membrane. In an embodiment, the fuel cell is provided in combination with a microfluidic device fabricated in the fuel cell membrane. In an embodiment, the fuel cell is provided with an external voltage source in electrical communication with the electrodes.

BRIEF DESCRIPTION OF FIGURES

For a more complete understanding of the present invention, reference is made to the following detailed description of exemplary embodiments considered in conjunction with the accompanying drawings, in which.

DETAILED DESCRIPTION OF THE INVENTION

In an embodiment, the present invention relates to the fabrication of an in-membrane micro-fuel cell (IMFC) device. In contrast to the conventional system, where the protons generated and consumed in catalyst layers flow through the membrane to which they are affixed, the IMFC is an in-plane proton-conducting device with its flow field and catalyst layers fully fabricated into the ion-conducting membrane. A pair of channels, which replace a conventional flow field component, is separated by a ridge which replaces a conventional membrane. The ridge isolates the molecular species contained within the channels, and their associated electrochemical half reactions, and the ridge also facilitates proton transport. Unlike the conventional PEM fuel cell device whose size is limited by the auxiliary components that serve as flow field, current collectors, and reactant distributors, the IMFC utilizes fewer materials for the deployment of a planar, low-weight, high-energy-density power source. The smallest dimension in a conventional single-stack assembly, typically the width of the assembly, is several centimeters in size, and scales-up for a multi-stack assembly. Conversely, for the IMFC, the critical dimension can be reduced to several microns in size and scaled two-dimensionally by replication across the membrane substrate or three-dimensionally by the stacking of membrane layers with fabricated structures. The use of fewer materials, particularly the exclusion of the graphite flow field that accounts for greater than 50% of the fuel cell's weight, makes the IMFC a high-energy-density device.

Figure 1:
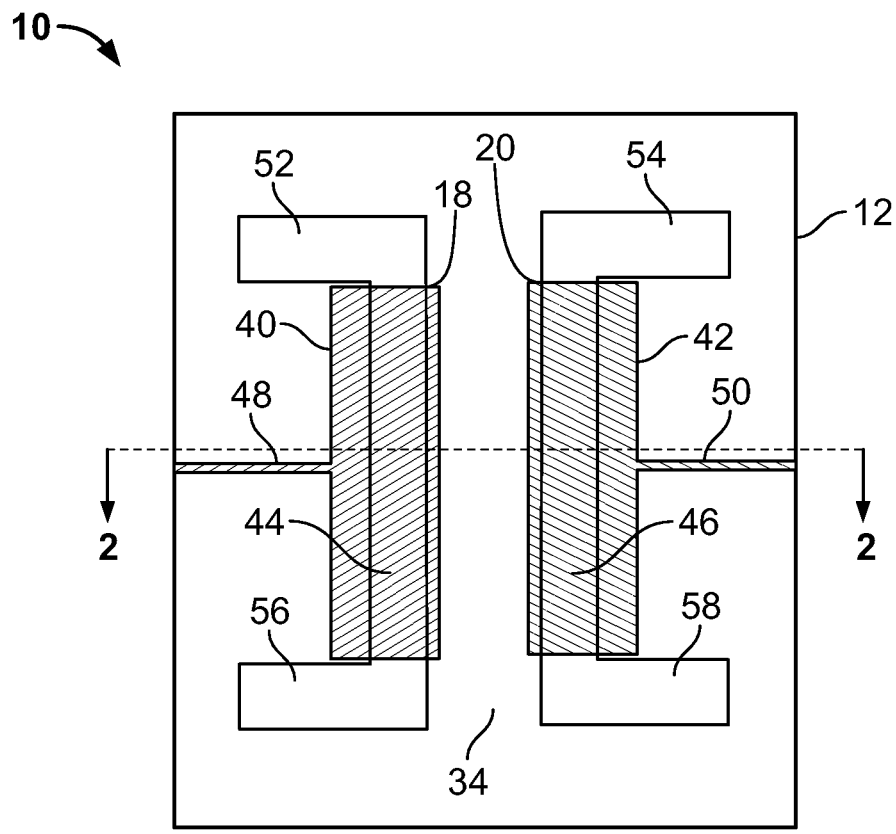
FIG. 1 is a schematic top-down view of an in-membrane micro fuel cell according to an embodiment of the present invention.
Figure 2:
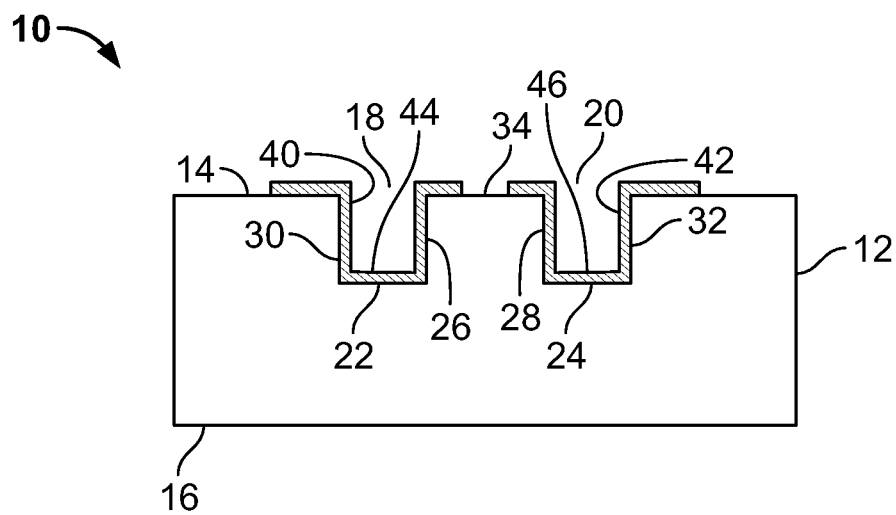
FIG. 2 is a schematic cross-section elevation of the in-membrane micro fuel cell of FIG. 1.

Referring to FIGS. 1 and 2, an embodiment of the IMFC 10 of the present invention is an in-plane cation-conducting device with its flow field and catalyst layers fully fabricated into the cation-conductive membrane 12. In an embodiment, the cation-conductive membrane includes an electrically-insulating, cation-conductive membrane 12 that is permissive to the flow of protons, and has a first surface 14 and a second surface 16 opposite the first surface 14. In an embodiment the cation is a proton, although, in an embodiment, the membrane 12 is permissive to the flow of protons and other cations. In an embodiment, the membrane 12 is includes a proton-conductive polymer (e.g., polybenzimidazole, hereinafter referred to as "PBI"). A pair of non-intersecting channels 18, 20 is formed in the first surface 14 of the membrane 12, each channel 18, 20 having a respective bottom surface 22, 24, inboard surface 26, 28, and outboard surface 30, 32 opposite the inboard surface 26, 28. In an embodiment, the bottom surface 22, 24 of each channel 18, 20 is located between the first membrane surface 14 and the second membrane surface 16. In an embodiment, the inboard surface 26, 28 of each channel 18, 20 extends from the bottom surface 22, 24 to the first surface 14 of the membrane 12. In an embodiment, the outboard surface 30, 23 of each channel 18, 20 extends from the bottom surface 22, 24 to the first surface 14 of the membrane 12.

In an embodiment of the present invention, the inboard surfaces 26, 28 define a membrane ridge 34 that separates the inboard surfaces 26, 28, and, thus, the channels 18, 20, from one another. The ridge 34 also isolates the molecular species (not shown) that are conveyed within the channels 18, 20 from each other, and facilitates proton transport within the membrane 12.

In an embodiment of the present invention, each channel 18, 20 is associated with an electrically-conductive electrode 40, 42, which is coextensive with at least a portion of one or more of the surfaces 22, 24, 26, 28, 30, 32 of the associated channel 18, 20. In an embodiment, the electrodes 40, 42 are also co-extensive with a portion of the first surface 14 of the membrane 12. When the IMFC 10 is operating, one of the electrodes 40, 42 serves as an anode 40, and the other serves as a cathode 42, depending on the half-reaction taking place in the associated channel 18, 20. The electrodes 40, 42 are in contact with the membrane 12, but are electrically isolated from one another. In an embodiment, the electrodes 40, 42 and channels 18, 20 are formed such that they may serve as conduits for fluid flow (e.g., gases or liquids flow or are conveyed along the electrodes 40, 42 and/or channels 18, 20). In an embodiment, the electrodes 40, 42 are formed as thin layers of electrically-conductive material on one or more of the surfaces 22, 24, 26, 28, 30, 32 of the channels 18, 20. In an embodiment, each of the electrodes 40, 42 has a catalytic surface 44, 46. In an embodiment, a catalyst is applied to the electrode 40, 42 at the catalytic surface 44, 46. In an embodiment, the electrically-conductive material is the catalyst at the catalytic surface 44, 46. In an embodiment, the electrically-conductive material is a porous material with catalytic properties. In an embodiment, the porous material is a patterned layer of catalyst. In an embodiment, the catalytic surface 44, 46 has properties for promoting the liberation of a proton and an electron from a chemical specie. In an embodiment, the catalytic surface 44, 46 has properties for promoting the recombination of an electron and proton with another chemical specie (e.g., the recombination of electrons and protons with oxygen to form water).

Unlike a conventional PEM fuel cell device (not shown) where the size of the fuel cell is limited by the auxiliary layers that serve as flow field, current collectors, and reactant distributors, an IMFC 10, according to embodiments of the present invention, utilizes less material to provide a planar, low weight, high energy density power source. The conventional PEM fuel cell (not shown) is a planar stack of materials including the membrane, electrocatalyst layers, carbon-paper gas-diffusion media, graphite flow field, and gold-plated metal current collector. The small dimension in a conventional single stack assembly is typically the width of the assembly, which may several centimeters in size and drastically scales-up for a multi-stack assembly. Conversely, for embodiments of the IMFC of the present invention, the critical dimension is reduced to tens of microns in size. Furthermore, an IMFC stack according to an embodiment of the present invention (not shown) can be constructed with no apparent change in dimensions other than the thickness of the stack. The use of fewer materials, particularly the exclusion of the graphite flow field that accounts for greater than 50% of the conventional fuel cell's weight, makes the IMFC of the present invention a higher energy density device than conventional PEM fuel cells.

In an embodiment, an IMFC uses hydrogen as a fuel. Such embodiments are highly energy efficient compared to IMFCs using other materials as fuels. For portable applications, however, hydrogen storage constitutes a major barrier, given the very low density of hydrogen. There are several strategies available for circumventing the storage issue including the use of in-situ miniature hydrogen generators, and metal hydrides that release hydrogen in response to stimuli. Instead of hydrogen, methanol can also be used as anode fuel due to the ease of storing methanol. Unlike hydrogen, the reaction involved in a methanol fuel cell also produces low amounts of carbon dioxide. This can be mitigated by using porous carbon dioxide traps.

Referring to FIGS. 1 and 2, electrochemical power is generated from the reduction and oxidation half-reactions occurring at the anode 40 and cathode 42 of the IMFC 10. Hydrogen or a small alcohol (e.g., methanol) can be fed to the anode 40 as fuel, while oxygen or air is fed to the cathode 42 as oxidant. Other small organic molecules, or other molecules of comparable size, may be used as fuels, as will be understood by persons having ordinary skill in the art and possession of the present disclosure. The anode oxidation reaction results in the production of protons and electrons (not shown). The protons are transported to the cathode 42 through the ridge 34, while the electrons are conducted through an electrical contact 48 at the anode 40, doing work and powering the connected load as the electrons move via electrical contact 50 to the cathode 42 to participate in a reduction reaction with protons and oxidant (e.g., oxygen). For example, at the anode 40, methanol is catalytically reduced to carbon monoxide, four protons, and four electrons. At the cathode 42, the protons and electrons combine with oxygen to form water.

In traditional fuel cells, electrical resistance is mitigated by inclusion of a conductive gas diffusion layer (not shown) and its adjacent bipolar plates (not shown). The use of thin layers of catalyst and electrodes in the IMFC reduces electrical conductivity and increases the distributive series resistance in the catalyst layer as current transport is parallel to the reaction plane versus the perpendicular transport in a standard PEMFC. This can be mitigated by the deposition of porous conductive structures (not shown) in the channels 18, 20.

In the IMFC 10 of FIGS. 1 and 2, the channels 18, 20 have a width of about 100 μm and are about 10 mm long. The width or the length of the electrodes may be selected according to the rate of power generation desired and the physical constraints governing the size of the IMFC. For example, in an embodiment of the present invention, the channels have a width in the range of about 50 μm to about 200 μm. The channels are connected at each end to larger rectangular channels 52, 54, 56, 58 that serve as feed input 52, 54 and output ports 56, 58. Each channel 18, 20 is etched to a depth in the range of about 10 μm to about 100 μm. In an embodiment, the depth of the channels 14, 16 is approximately 20% of the total thickness of a conventional commercially available proton-conductive membrane (e.g., Nafion® 212). In embodiments of the present invention, IMFC having deeper channels show superior performance (e.g., higher energy densities) for a given superficial membrane area (e.g., a given area of first membrane surface 12).

In an embodiment, the separation distance between the two channels 18, 20, herein called the "ridge width", is in the range of about 50 μm to about 400 μm. The ridge width is the shortest distance for proton transport in the microfabricated IMFC of the present invention. In embodiments of the present invention, IMFC having shorter ridge widths show superior performance (e.g., higher energy densities) for a given superficial membrane area or a given area of electrodes 18, 20.

Figure 3:
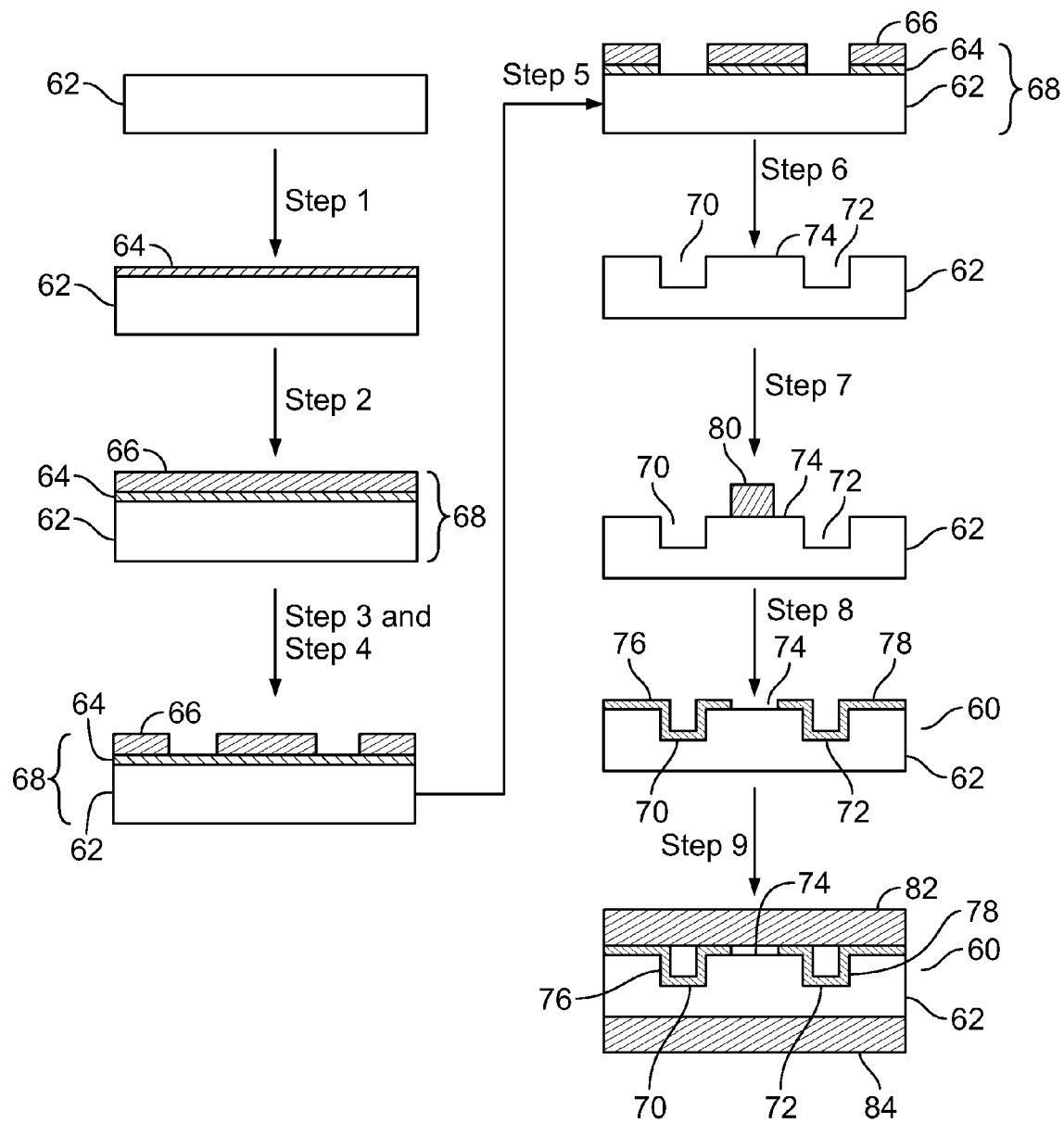
FIG. 3 is a schematic process diagram for a method of preparing an in-membrane micro fuel cell according to an embodiment of the present invention.

Referring now to FIG. 3, a method of constructing an IMFC 60 of the same general type as IMFC 10 of FIGS. 1 and 2 begins with the patterning of the proton-conducting membrane 62. In an embodiment, a commercially available Nafion® 212 membrane is used. In preparation for the microfabrication process, the membrane 62 is mounted on a silicon wafer (not shown) using Kapton tape (not shown). In step 1, a 30 nm-thick germanium (Ge) layer 64 is sputter deposited using, for example, a Lesker PVD-75 sputter coater (Kurt J. Lesker Company, Jefferson Hills, Pa.) equipped with a thickness monitor for film thickness and rate determination. In step 2, an electron beam resist (e.g. Zep 520A (ZEON Chemicals, L.P., Louisville, Ky.) is subsequently spun onto the Ge layer 64 and baked to form a resist layer 66. In step 3, the Ge layer 64 is then exposed using, for example, a JEOL 6300FS electron beam system (JEOL USA, Inc., Peabody, Mass.). The nominal dose and current (for example) may be 150 μC/cm$^2$ and 15 nA respectively. In step 4, the layered substrate 68 (i.e., membrane 62, Ge layer 64, and resist 66) is developed in xylene and then dried using a nitrogen gun. The developed structure 68 is then etched in $CHF_3$ gas (step 5) to transfer the developed pattern into the Ge layer 64, followed by $O_2$ etching for pattern transfer into the membrane 62 (step not shown). After the required pattern depth is achieved into the membrane 62 via $O_2$ etching, a terminal $CHF_3$ etching step is performed to remove the residual Ge layer 64 (step 6), leaving channels 70, 72 within the membrane 62 and a membrane ridge 74.

In preparation for the selective deposition of patterned electrocatalyst layers 76, 78, (i.e., electrodes 76, 78), a thin strip (about 300 μm width) of adhesive Kapton tape (not shown) is aligned onto the ridge 74 separating the microchannels 70, 72 using an optical microscope (step 7). This step 7 is employed to prevent material deposition under the mask 80 that may lead to an electronic short circuit when the IMFC is in use. A shadow mask 80 (e.g., a Mylar® strip, DuPont Company, Wilmington, Del.) is then placed atop the ridge 74 for selective deposition of electrodes 70, 72. Alternatively, the membrane may be coated with light sensitive photoresist and exposed to delineate the ridge 74. Conventional Pt/C dispersion and/or sputtered Pt may be deposited as catalyst layers 76, 78 (step B). Pt sputtering may be done using a Lesker PVD-75 sputter coater (mentioned above) with a gas pressure, power and deposition rate of 5 mtorr, 70 W, and 0.08 nm/s respectively. Pt/C may be deposited by spraying a sonicated mixture of Pt on carbon dispersed in isopropanol/water/ionomer mixture onto the masked patterned membrane with a spray gun. In step 9, top and bottom structures 82, 84 are applied to the IMFC 60 to seal the channels 76, 78 and provide structural support to the IMFC 60.

In practical exemplary embodiments of the present invention, conventional platinum/carbon (Pt/C) dispersion and sputtered platinum (Pt) were tested as catalyst/electrode layers. Other suitable catalysts are known in the art, such as platinum metal, platinum-ruthenium, and platinum-nickel catalysts. Other catalysts that may be used in PEM fuel cells are presently under development, and their utility in embodiments of the present invention will be recognized as the art continues to develop. The selection of catalysts for fuel cell anodes and cathodes is discussed more fully in U.S. Pat. No. 8,741,501, issued on Jun. 3, 2014, the disclosure of which is incorporated by reference herein in its entirety.

Figure 4A:
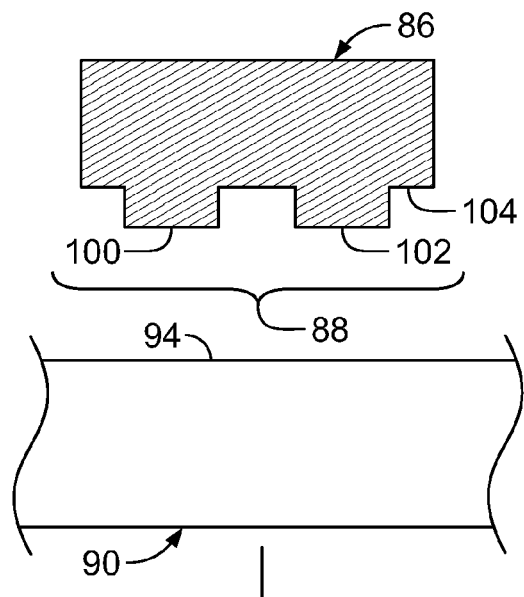
FIGS. 4A-4C are a sequenced set of schematic diagrams illustrating steps of forming channels in a membrane, according to an embodiment of the present invention.
Figure 4B:
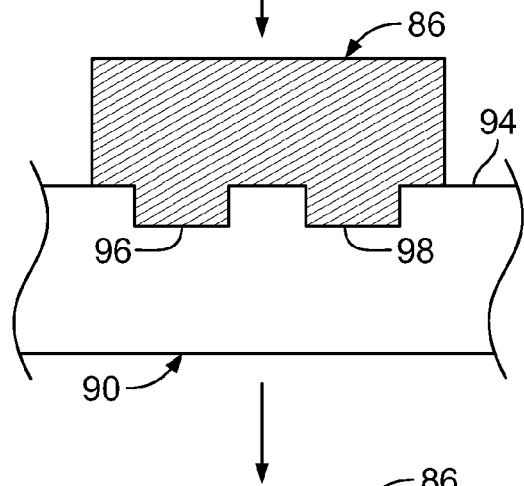
Figure 4C:
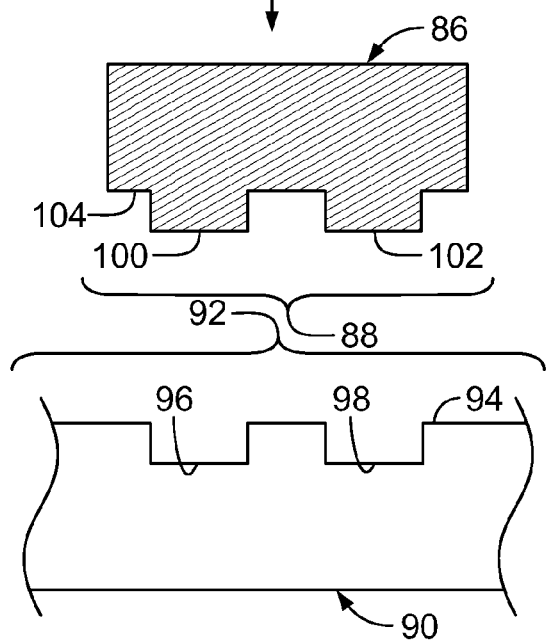

According to another method of the present invention, channels of the same general type as channels 70, 72 of FIG. 3 may be formed in a membrane using nanoimprint lithography (NIL). NIL may be beneficially employed to generate a three-dimensional pattern in a polymer membrane. FIGS. 4A-4C represent a schematic illustration of an NIL process as it may be applied in an embodiment of the present invention. A heated die 86 having a patterned surface 88 is pressed against a surface of a polymer membrane 90 at an elevated temperature, such as a temperature near the glass-transition temperature ($T_g$) of the polymer (FIG. 4B). The die 86 is then withdrawn, leaving a pattern 92 on the surface 94 of the membrane 90 that is the inverse of the imprinted patterned surface 88 of the die 86 (i.e., the channels 96, 98 (FIG. 4C). The entire process is rapid, permits control over the depth of the imprinted pattern 92, and can be adapted to high-volume manufacturing.

In an embodiment of a process for making an IMFC according to the present invention, it is important to prepare a die with the appropriate geometry to be replicated in the membrane 90. While such a die may be used repeatedly, it must first be constructed with the desired geometry and pattern. According to an embodiment of the present invention, the patterned surface 88 includes raised ridges 100, 102 projecting outward from the surface 104 of the die 86 and having dimensions similar to those dimensions desired for the channels 96, 98. When the die 86 is then withdrawn, the resulting pattern 92 on the surface 94 of the membrane 90 includes the channels 100, 102).

Figure 5:
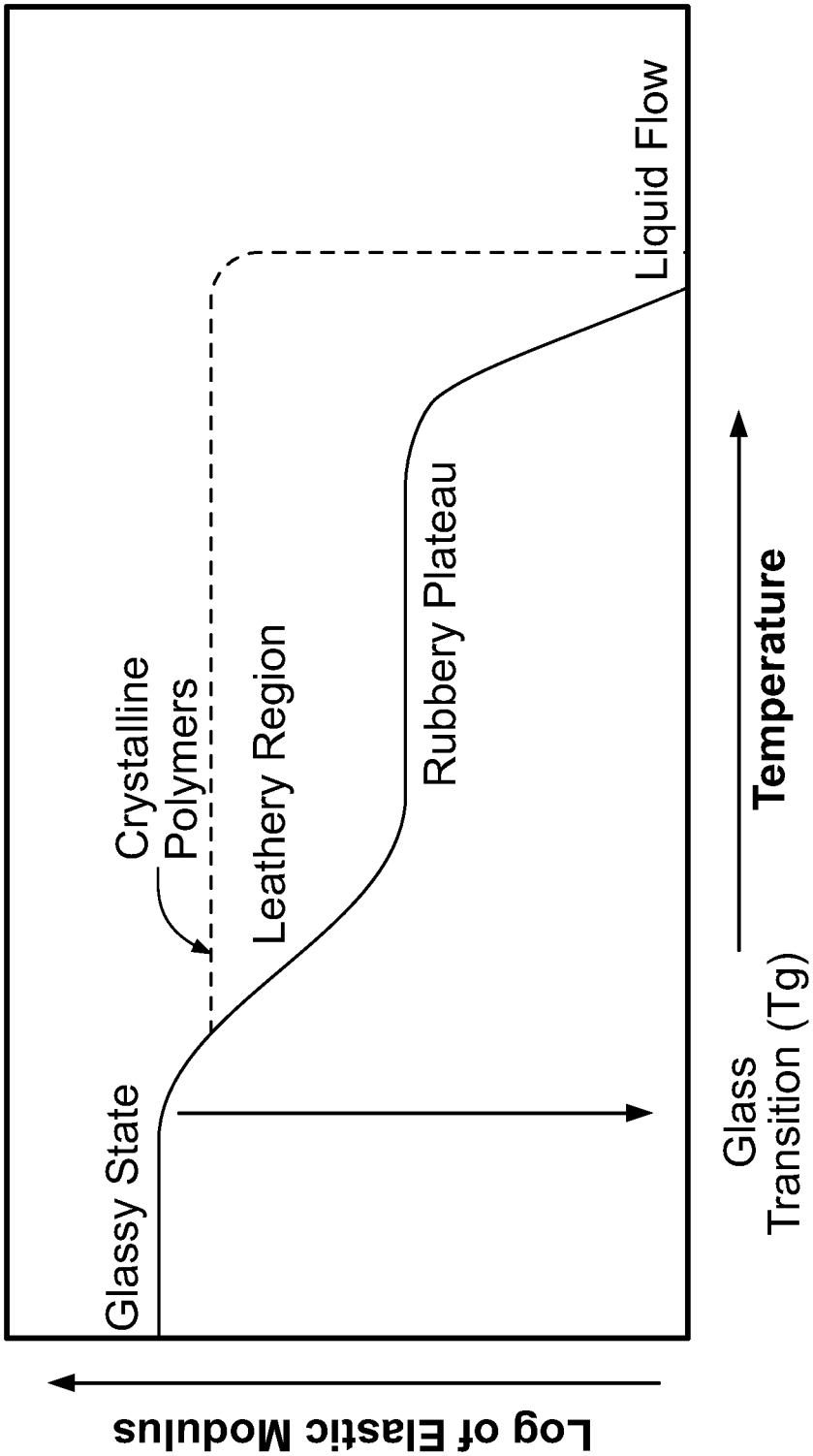
FIG. 5 is a graph showing changes in the elastic modulus of a polymeric substrate in response to changes in temperature.
Figure 6:
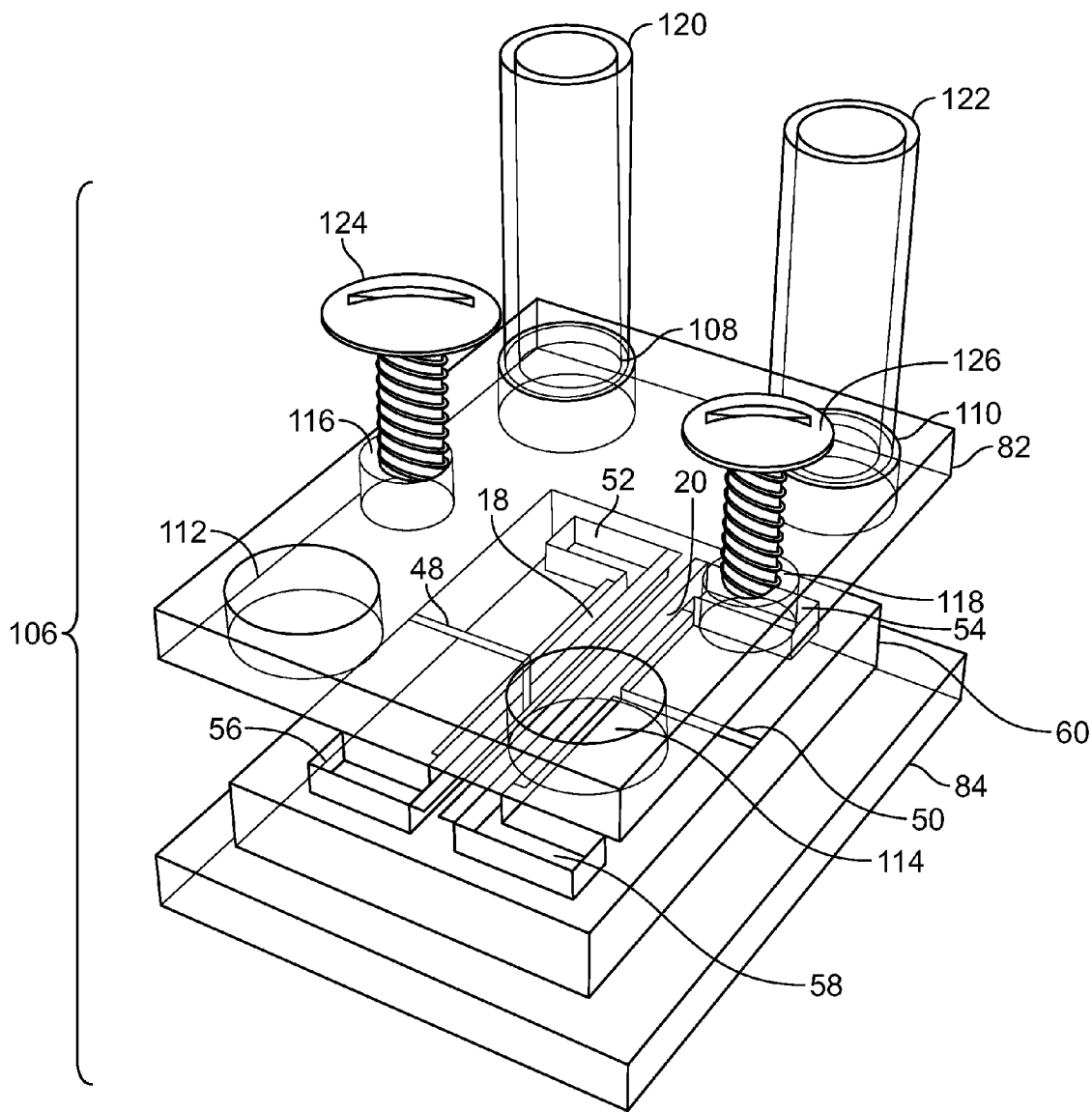
FIG. 6 is a schematic exploded view of an in-membrane micro fuel cell assembly according to an embodiment of the present invention.

The aforementioned conditions derive from the viscoelastic thermal response of thermoplastic polymers as illustrated in FIG. 5. Near the glass-transition temperature of the polymer (e.g., 400 to 425° C. for PBI), the elastic modulus of the polymer drops precipitously with increased temperature. At slightly higher temperatures, the polymer may be subjected to forces that result in viscous flow of the material, permitting formation of a pattern in the polymer. The NIL process therefore depends not only on temperature, but also on heating rates and strain rates. This is illustrated in FIG. 6 which is an applied force and temperature vs. time plot from an NIL process carried out on a polycarbonate sample. Thus, it is important that the NIL system (sometimes referred to as a "hot embossing system") used to imprint the membrane 90 has the ability to control the temperature, force, application rates and other parameters of the NIL process for the particular polymer that is to be used. After formation of the channels 96, 98, electrodes (not shown) may be deposited in the channels 96, 98, and the IMFC (not shown) mounted and sealed, as discussed above with respect to FIG. 3.

In yet another method according to the present invention, the die 86 of FIGS. 4A-4C may be used as a molding master for solvent casting raw polymers into membranes having channels, such as channels 96, 98 in membrane 90 of FIG. 4C. In a solvent casting process, a raw polymer is dissolved in a solvent and the solution is deposited onto the die. The solvent evaporates, leaving behind a polymer membrane having the inverse imprint of the raised ridges 100, 102 of the die 86 (i.e., the channels 100, 102). PBI material, for example, is available as high purity raw polymer, which is able to be solvent cast into high quality membranes. After formation of the channels 100, 102, electrodes (not shown) may be deposited in the channels 100, 102, and the IMFC mounted and sealed, as discussed above with respect to FIG. 3.

An IMFC according to the aforementioned embodiments of the present invention provides a model for other in-membrane devices that employ electrodes for the collection of cations, such as certain types of biosensors and other electrochemical sensors. For example, since Nafion® is a cation-conductive membrane, it may be used in a biosensor to permit the selective collection of key ions related to some aspect of metabolism (e.g., proportional to a rate of a metabolic process, or to a concentration of a biomolecule of interest). Nafion® and other ion-conductive membrane materials are also relatively inert and biocompatible, making IMFC of the present invention and sensors having an IMFC-like topology suitable for both in vitro and in vivo applications. Sensors and microfluidic structures could be built in the membrane, using methods such as those discussed above in relation to IMFC's of the present invention, allowing the fabrication of micro-scale devices. In addition, such sensors and microfluidic devices could perform better than those presently in the art, since electrodes and other components of the sensors or microfluidic devices can be integrated directly into the membrane, resulting in such advantages as shorter ion transit distances and lower voltage drops due to shorter distances between the sensor or microfluidic device and the power source (e.g., an integrated IMFC, an integrated microbattery, or connection points of an external power supply). It may also be noted that an external voltage can be applied across the electrodes of an IMFC according to embodiments of the present invention to drive the half-reactions in the reverse direction of those described herein. For example, an IMFC 10, 60 can be operated as a hydrolyzer to produce hydrogen and oxygen from water by attaching the electrodes to the terminals of a battery. The IMFC can also provide a model for humidification applications, wherein the membrane 12 has water management properties such that water is transferred via the membrane to gasses within one of the channels 18, 20, or for inter-channel 18, 20 moisture exchange between gasses within one of the channels 18, 20 and gasses within another one of the channels 18, 20. For example, Nafion® has water management properties suitable for such water transfer and exchange.

Figure 7:
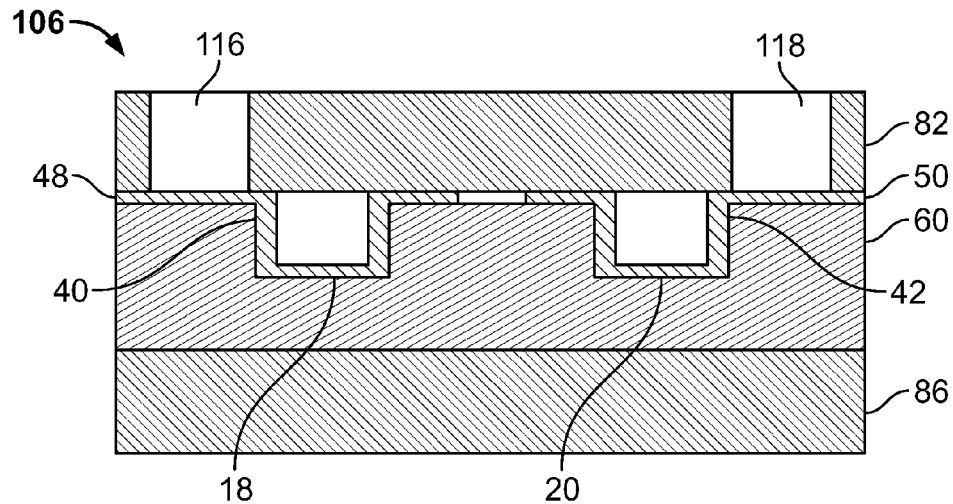
FIG. 7 is a schematic crossectional view of the in-membrane micro fuel cell of FIG. 1.

Referring now to FIGS. 6 and 7, an IMFC 60 prepared according to the method of FIG. 3 was mounted to form an IMFC assembly 106. Two sheets of 4 cm×4 cm acrylic plastic having a thickness of 1.5 mm were selected to form the top and the bottom structures 82, 84, which encased and supported the IMFC 60. A total of six holes 108, 110, 112, 114, 116, 118 were drilled into the top structure 82, four holes to serve as anode and cathode inlets 108, 110 and outlets 112, 114, and two holes 116, 118 for electrical connections to the electrodes 48, 50. The IMFC 60 was sandwiched between the top and bottom structures 82, 84, with inlet and outlet holes 108, 110, 112, 114 aligned to the inlets 52, 54 and outlets 56, 58 of the channels 18, 20 and holes 116, 118 aligned to the electrodes 116, 118. The resulting IMFC assembly 106 was hot-pressed at 135° C. and about 300 lbs. pressure for 20 seconds using a Carver model 4388 (Carver, Inc., Wabash, Ind.) hot-press equipped with a digital pressure gauge. Upon removal from the hot-press, the IMFC assembly 106 was placed on a flat surface and lightly pressed as it cooled. Inlet tubes 120, 122 were fit into holes 108, 110. A set of screws 124, 126 was then glued into the holes 116, 118 in electrical contact with electrical connectors 48, 50 using conductive silver epoxy as a binder.

Figure 8:
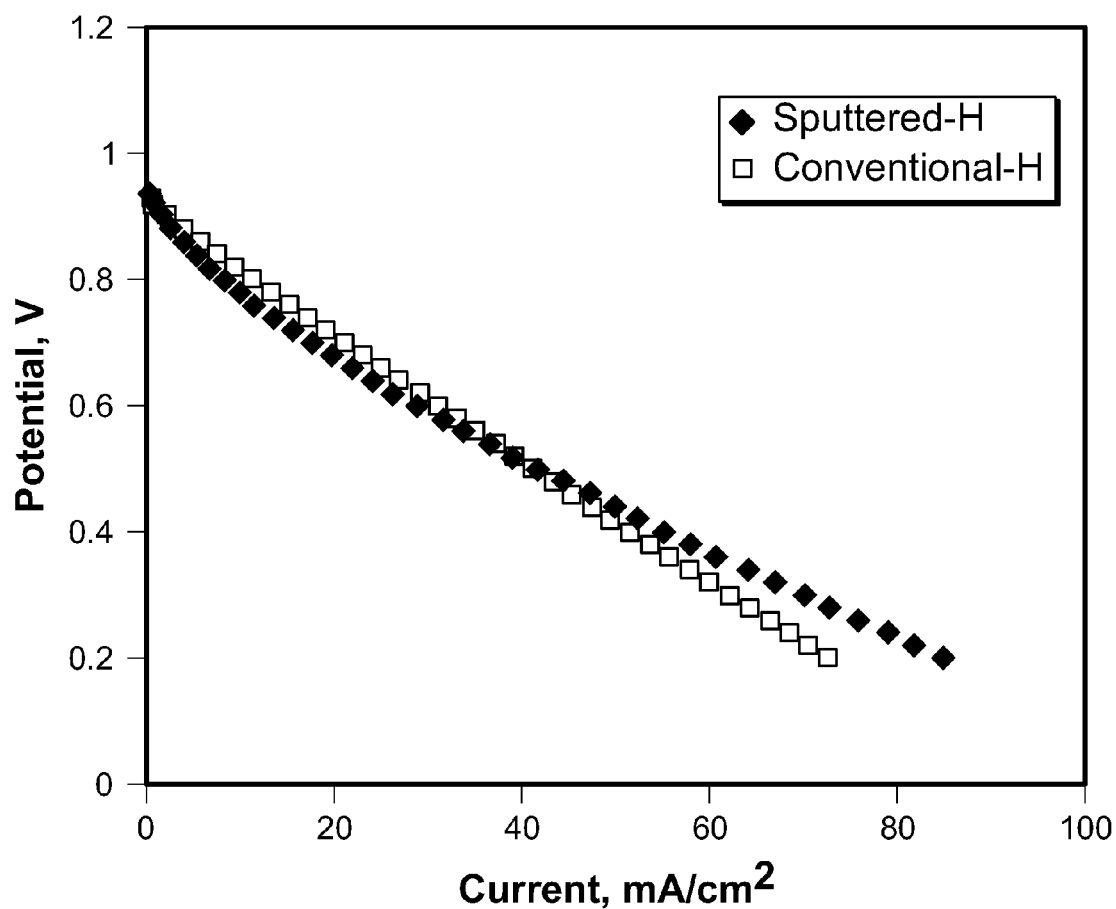
FIG. 8 is an I-V curve of the results of a test of an in-membrane micro fuel cell according to an embodiment of the present invention.

The exemplary IMFC assembly 106, fabricated according to the method of FIGS. 3, 6, and 7 was tested with sputter-deposited platinum serving as the catalyst layer. For performance testing, humidified $H_2$ and $O_2$ were fed at 20 sccm and 40 sccm to the anode and cathode respectively. A Scribner 850e test system (Scribner Associates, Inc., Southern Pines, N.C.) was used to control the flow rate and humidity of the gases. No additional backpressure was added and all testing was conducted at room temperature. Prior to performance testing, the test cell was conditioned at 0.3-0.4V until the current stabilized and for performance testing, the cell potential was scanned in the direction of decreasing voltage. Both voltage and current density data were recorded, with the results plotted in FIG. 8.

It should be understood that the embodiments of the invention described herein are merely exemplary and that a person skilled in the art may make many variations and modifications without departing from the spirit and scope of the invention.

All such variations and modifications are intended to be included within the scope of the invention as defined in the appended claims.

We claim:

1. A fuel cell, comprising:
   an electrically-insulating membrane that is permissive to the flow of protons, said membrane having a first membrane surface and a second membrane surface opposite said first membrane surface;

a pair of non-intersecting channels formed in said first membrane surface, each of said channels having a respective bottom surface located between said first membrane surface and said second membrane surface, a respective inboard surface extending from said bottom surface to said first membrane surface, and a respective outboard surface opposite said inboard surface and extending from said bottom surface to said first membrane surface, said inboard surfaces defining a membrane ridge in said electrically-insulating membrane that separates said inboard surfaces from one another and is permissive to the flow of protons; and a pair of electrically-conductive electrodes, each of said electrodes associated with a corresponding one of said pair of channels, each of said electrodes being coextensive with at least a portion of at least one said bottom surface, said inboard surface, and said outboard surface of said associated channel, each of said electrodes having a respective exposed catalytic surface, said catalytic surface of one of said pair of electrodes having properties for promoting the liberation of an electron from a chemical specie, and said catalytic surface of the other of said pair of electrodes having properties for promoting the combination of an electron with another chemical specie, each of said electrodes being electrically-insulated from one another.

2. The fuel cell of claim 1, wherein said catalytic surface of said one of said pair of electrodes has properties for promoting the liberation of a proton and an electron from a chemical specie.

3. The fuel cell of claim 2, wherein said catalytic surface of said other of said pair of electrodes has properties for promoting the formation of water from oxygen, protons, and electrons and the accompanying generation of electrical power.

4. The fuel cell of claim 1, wherein said first membrane surface and said bottom surface of at least one of said channels are separated by a distance in the range of about 10 microns to about 100 microns.

5. The fuel cell of claim 1, wherein said inboard surface and said outboard surface of at least one of said channels are separated by a distance of about 50 microns to about 200 microns.

6. The fuel cell of claim 1, wherein said inboard surfaces are separated from each other by a distance in the range of about 50 microns to about 400 microns.

7. The fuel cell of claim 1, wherein at least one of said electrodes is coextensive with a portion of said first membrane surface.

8. The fuel cell of claim 1, wherein said electrodes and said channels are arranged as conduits for fluids.

9. The fuel cell of claim 1, wherein said electrodes are porous.

10. The fuel cell of claim 1, wherein said electrodes include a catalytic metal applied to least one of said surfaces of each channel by a sputtering process.

11. The fuel cell of claim 1, wherein said membrane is permissive to protons and other cations, said fuel cell in combination with a biosensor fabricated in said membrane.

12. The fuel cell of claim 1, wherein said membrane is permissive to protons and other cations, said fuel cell in combination with an electrochemical sensor fabricated in said membrane.

13. The fuel cell of claim 1, in combination with a microfluidic device fabricated in said membrane.

14. The fuel cell of claim 1, in combination with an external voltage source having a positive pole in electrical communication with said one of said pair of electrodes and a negative pole in electrical communication with said other of said pair of said electrodes.

15. The fuel cell of claim 1, wherein said membrane has water management properties such that water is transferred by transport through said membrane to a gas stream in one of said channels.

16. The fuel cell of claim 15, wherein water is exchanged between the gas in said one of said channels and another gas in the other of said channels by transport through said membrane.

17. The fuel cell of claim 1, wherein said inboard surfaces of said channels are perpendicular to said first membrane surface and said bottom surfaces of said channels, thereby allowing protons to flow through said membrane ridge parallel to said first membrane surface and said second membrane surface.

18. The fuel cell of claim 1, wherein said channels are formed entirely within said electrically-insulating membrane.

19. The fuel cell of claim 1, further comprising a fuel cell body that is coextensive with said membrane, said membrane and said fuel cell body both being made from a same material that is permissive to the flow of protons.

20. In combination:

a fuel cell, comprising an electrically-insulating membrane that is permissive to the flow of protons and other cations, said membrane having a first membrane surface and a second membrane surface opposite said first membrane surface, a pair of non-intersecting channels formed in said first membrane surface, each of said channels having a respective bottom surface located between said first membrane surface and said second membrane surface, a respective inboard surface extending from said bottom surface to said first membrane surface, and a respective outboard surface opposite said inboard surface and extending from said bottom surface to said first membrane surface, said inboard surfaces defining a membrane ridge that separates said inboard surfaces from one another, and a pair of electrically-conductive electrodes, each of said electrodes associated with a corresponding one of said pair of channels, each of said electrodes being coextensive with at least a portion of at least one said bottom surface, said inboard surface, and said outboard surface of said associated channel, each of said electrodes having a respective exposed catalytic surface, said catalytic surface of one of said pair of electrodes having properties for promoting the liberation of an electron from a chemical specie, and said catalytic surface of the other of said pair of electrodes having properties for promoting the combination of an electron with another chemical specie, each of said electrodes being electrically-insulated from one another; and a biosensor fabricated in said membrane.

21. In combination:

a fuel cell, comprising an electrically-insulating membrane that is permissive to the flow of protons and other cations, said membrane having a first membrane surface and a second membrane surface opposite said first membrane surface, a pair of non-intersecting channels formed in said first membrane surface, each of said channels having a respective bottom surface located between said first membrane surface and said second membrane surface, a respective inboard surface extending from said bottom surface to said first membrane surface, and a respective outboard surface opposite said inboard surface and extending from said bottom surface to said first membrane surface, said inboard surfaces defining a membrane ridge that separates said inboard surfaces from one another, and a pair of electrically-conductive electrodes, each of said electrodes associated with a corresponding one of said pair of channels, each of said electrodes being coextensive with at least a portion of at least one said bottom surface, said inboard surface, and said outboard surface of said associated channel, each of said electrodes having a respective exposed catalytic surface, said catalytic surface of one of said pair of electrodes having properties for promoting the liberation of an electron from a chemical specie, and said catalytic surface of the other of said pair of electrodes having properties for promoting the combination of an electron with another chemical specie, each of said electrodes being electrically-insulated from one another; and an electrochemical sensor fabricated in said membrane.

22. In combination:

a fuel cell, comprising an electrically-insulating membrane that is permissive to the flow of protons, said membrane having a first membrane surface and a second membrane surface opposite said first membrane surface, a pair of non-intersecting channels formed in said first membrane surface, each of said channels having a respective bottom surface located between said first membrane surface and said second membrane surface, a respective inboard surface extending from said bottom surface to said first membrane surface, and a respective outboard surface opposite said inboard surface and extending from said bottom surface to said first membrane surface, said inboard surfaces defining a membrane ridge that separates said inboard surfaces from one another, and a pair of electrically-conductive electrodes, each of said electrodes associated with a corresponding one of said pair of channels, each of said electrodes being coextensive with at least a portion of at least one said bottom surface, said inboard surface, and said outboard surface of said associated channel, each of said electrodes having a respective exposed catalytic surface, said catalytic surface of one of said pair of electrodes having properties for promoting the liberation of an electron from a chemical specie, and said catalytic surface of the other of said pair of electrodes having properties for promoting the combination of an electron with another chemical specie, each of said electrodes being electrically-insulated from one another; and a microfluidic device fabricated in said membrane.

* * * * *

UNITED STATES PATENT AND TRADEMARK OFFICE
CERTIFICATE OF CORRECTION

| | |
|---|---|
| PATENT NO. | : 9,437,893 B2 |
| APPLICATION NO. | : 14/471753 |
| DATED | : September 6, 2016 |
| INVENTOR(S) | : Ayokunle Omosebi and Ronald Besser |

Page 1 of 1

It is certified that error appears in the above-identified patent and that said Letters Patent is hereby corrected as shown below:

In the Specification
Column 1, Line 11, replace the paragraph after the heading "Statement Regarding Federally Sponsored Research" with the following:
-- This invention was made with government support under Grant Number W911NF-10-0453 awarded by the Army Research Office. The government has certain rights in the invention. --

Signed and Sealed this
Twenty-second Day of September, 2020

Andrei Iancu
*Director of the United States Patent and Trademark Office*